C. BENERLIN.
VELOCIPEDE.
APPLICATION FILED JULY 9, 1918.
1,297,314.
Patented Mar. 18, 1919.
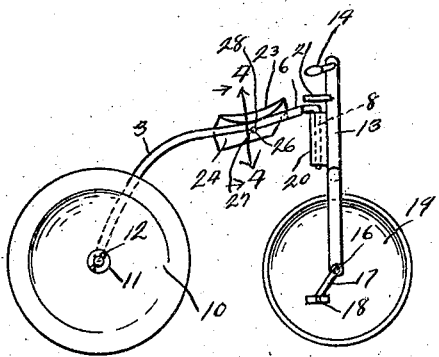
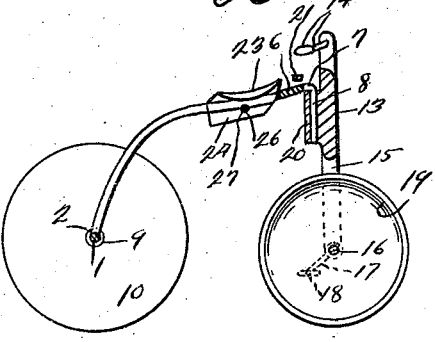
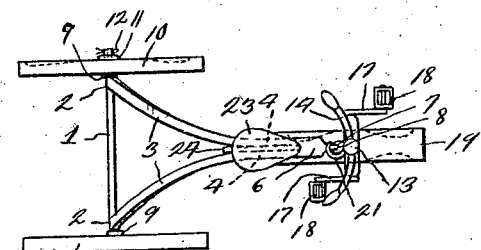
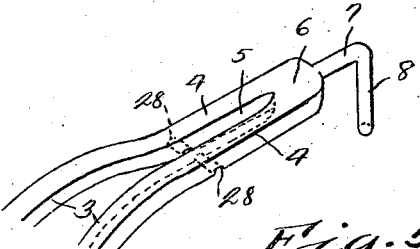
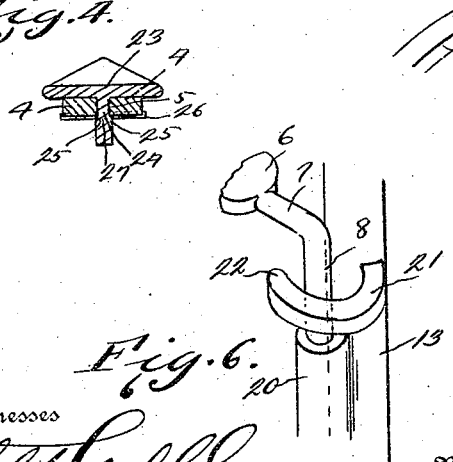
Inventor
C. Benerlin
Witnesses

UNITED STATES PATENT OFFICE.

CLIFTON BENERLIN, OF CONDON, OREGON.

VELOCIPEDE.

1,297,314.   Specification of Letters Patent.   Patented Mar. 18, 1919.

Application filed July 9, 1918. Serial No. 244,031.

*To all whom it may concern:*

Be it known that I, CLIFTON BENERLIN, a citizen of the United States, residing at Condon, in the county of Gilliam, State of Oregon, have invented a new and useful Velocipede; and I do hereby declare the following to be a full, clear, and exact description of the invention, such as will enable others skilled in the art to which it appertains to make and use the same.

This invention relates to an improved toy such as a velocipede, and one of the objects of the invention is to provide a device of this kind particularly adapted for small children.

A further object of the invention is to provide a velocipede, in which the tread rims of the wheels are very broad, in order to assist in preventing tilting of the device when in use.

A further object of the invention is to provide a velocipede, in which improved means is afforded, for detachably connecting the frame and the head, and yet at the same time to permit the head to swivel, so that the front single wheel may be turned to the right or the left.

A further object of the invention is to provide a velocipede head having a cylindrical tubular bearing for the reception of a vertical extension of the frame rockably therein, there being means carried by the head, to prevent upward disconnections of the frame, unless the frame is thrown excessively to one side to permit of its removal.

A further object of the invention is the provision of a bicycle frame provided with rearwardly extending forks, the forward ends of which are spaced in parallelism for the reception of a downwardly extending contracted rib or flange for a simple form of seat or saddle, to support the seat firmly, there being a transverse pin in the rib or flange engaging notches of the forks to prevent rearward movement of the seat.

In practical fields the details of construction may necessitate alterations falling within the scope of what is claimed.

The invention comprises further features and combination of parts as hereinafter set forth shown in the drawings and claimed.

In the drawings:—

Figure 1 is a view in side elevation of the velocipede constructed in accordance with the invention.

Fig. 2 is a vertical sectional view through the same showing the wheels, the seat and part of the frame in elevation.

Fig. 3 is a plan view of the velocipede.

Fig. 4 is a sectional view on line 4—4 of Fig. 1.

Fig. 5 is a detail perspective view of the forward end of the frame of the velocipede.

Fig. 6 is a detail perspective view showing the form of connection of the forward end of the frame and the head of the velocipede.

Referring more especially to the drawings 1 designates the rear axle of the velocipede, and integrally connected thereto as shown at 2 are forks 3, which extend outwardly and forwardly and converge and terminate in parallel parts 4, which are spaced to form the slot 5, and have their forward ends integrally connected as shown at 6. Projecting from the integral connection 6 is a forward extension 7 provided with a downwardly right angle extending portion 8.

Adjacent where the forks 3 are integrally connected to the axle 1 collars 9 are integrally formed on the axle, to prevent inward movement of the supporting wheels 10, which are journaled on the ends of the axle, there being washers 11 and cotter pins 12 to prevent outward axial movement of the wheel.

The head 13 of the velocipede has its upper end provided with the conventional form of transversely disposed and curved handle bars 14. The lower end of the head 13 terminates in the usual downwardly extending front forks 15, in bearings of which the front axle 16 is journaled, which front axle is provided with the usual cranks 17 and pedals 18. A front wheel of conventional form designated by the numeral 19 is fixed to rotate with the axle 16. The tread rim of this wheel is designed, as shown to be twice the width of the tread rims of the rear wheels 10, thereby preventing excessive tilting of the velocipede, particularly since it is used by small children. However, the tread rims may be of any suitable width, but it is to be understood that the front tread rim is to be twice the width of the rims of the rear wheels. The head 13 has a cylindrical tubular bearing 20, for the reception of the downwardly extended right angle portion 8 of the extension 7, whereby the head 13 is swivelly connected to the frame. Connected integrally to the head is an arm 21, which is curved and long enough to overlie the extension 7, thereby preventing upward movement or disconnection of the telescopically received parts 8 and 20. However, the extension 7 may be removed and inserted by moving the frame pivotally to one side, so that the extension 7 may pass through the space between the extremity 22 of the arm and the exterior cylindrical wall of the head 13. A suitable seat or saddle 23 is provided, and extending downwardly and centrally from the saddle or seat is an elongated rib or flange 24, which fits the slot 5 between the parallel part 4 of the rear forks 3. It is to be noted that the rib, or flange 24 is considerably contracted, where it engages the slot 5, so as to cause the formation of the shoulders 25, which engage the parts 4 and prevent upward movement of the seat or saddle in case the pin 26 has been removed. However, this pin is removably fixed in a transverse opening 27 of the rib or flange, and the lateral parts of the pin are designed to engage the semi-circular recesses 28 of the under faces of the parallel parts 4, thereby preventing rearward movement of the seat or saddle.

The invention having been set forth what is claimed as new and useful is:—

1. In a velocipede, the combination with a velocipede frame having parallel side bars spaced from each other to form a slot, of a seat having a downwardly extending rib or flange engaging said slot, the under surfaces of the side bar of the frame having semi-circular recesses, and a pin removably fixed in the rib or flange and engaging said recesses to retain the seat on the frame.

2. In a velocipede, the combination with a velocipede frame having parallel side bars spaced from each other to form a slot, of a seat having a downwardly extending rib or flange engaging said slot, the under surfaces of the side bar of the frame having semi-circular recesses, and a pin removably fixed in the rib or flange and engaging said recesses to retain the seat on the frame, said rib or flange having a restricted part, thereby causing the formation of shoulders on either side of the rib to prevent upward displacement of the seat should the pin be removed.

In testimony whereof I have signed my name to this specification in the presence of two subscribing witnesses.

CLIFTON BENERLIN.

Witnesses:
D. N. MACKAY,
G. T. BURNS.

Copies of this patent may be obtained for five cents each, by addressing the "Commissioner of Patents, Washington, D. C."